United States Patent
Jang et al.

(10) Patent No.: US 8,548,504 B2
(45) Date of Patent: Oct. 1, 2013

(54) COMMUNICATION METHOD OF A MOBILE TERMINAL AND METHOD OF ADVERTISING TO A MOBILE TERMINAL

(75) Inventors: Kyung Hun Jang, Suwon-si (KR); Tae Soo Kwon, Hwaseong-si (KR); Hyun Ho Choi, Suwon-si (KR); Jong Bu Lim, Yongin-si (KR); Won Jae Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 13/013,617

(22) Filed: Jan. 25, 2011

(65) Prior Publication Data
US 2011/0306324 A1    Dec. 15, 2011

(30) Foreign Application Priority Data
Jun. 14, 2010    (KR) .................. 10-2010-0055844

(51) Int. Cl.
*H04W 24/00*    (2009.01)
(52) U.S. Cl.
USPC ............... 455/456.3; 455/432.3; 455/436; 455/437; 455/440; 455/443; 455/448; 455/449; 455/450; 455/452.1; 455/456.6; 455/515; 370/328; 370/329; 370/330; 370/331; 370/338
(58) Field of Classification Search
USPC .......... 455/432.3, 435.1, 436–444, 446–450, 455/456.1, 456.3, 456.5, 456.6, 7, 11.1, 452.2, 455/515, 434; 370/328, 329, 330, 331, 338
See application file for complete search history.

(56) References Cited

U.S. PATENT DOCUMENTS

| | | | |
|---|---|---|---|
| 7,107,055 B2* | 9/2006 | Gallagher et al. | 455/436 |
| 8,144,725 B2* | 3/2012 | Bienas et al. | 370/449 |
| 8,180,368 B2* | 5/2012 | Anderson et al. | 455/456.1 |
| 8,345,633 B2* | 1/2013 | Bradley et al. | 370/331 |
| 2009/0021287 A1* | 1/2009 | Jang et al. | 327/109 |
| 2009/0135758 A1* | 5/2009 | Alper et al. | 370/328 |

(Continued)

FOREIGN PATENT DOCUMENTS

| | | |
|---|---|---|
| JP | 2009-0188629 | 8/2009 |
| KR | 10-0858282 | 9/2008 |
| KR | 10-2009-0110103 A | 10/2009 |
| KR | 10-2010-0011271 | 2/2010 |

OTHER PUBLICATIONS

International Search Report and Written Opinion of the International Searching Authority issued Sep. 27, 2011, in counterpart International Application No. PCT/KR2011/000607, 7pp.

*Primary Examiner* — Olumide T Ajibade Akonai
(74) *Attorney, Agent, or Firm* — NSIP Law

(57) ABSTRACT

A communication method of a macro base station including reporting information about a broadcast channel section in order to identify a femtocell in the macrocell, is provided. The macro base station receives position information of a mobile terminal and a request for information about neighboring femto base stations from the mobile terminal, when the mobile terminal identifies an accessible femto base station in the broadcast channel section. The macro base station generates a list of the neighboring femto base stations and information about the neighboring femto base stations based on the position information of the mobile terminal, and transmits the list and the information about the neighboring femto base stations to the mobile terminal.

14 Claims, 5 Drawing Sheets

(56) References Cited

U.S. PATENT DOCUMENTS

| | | |
|---|---|---|
| 2009/0168727 A1* | 7/2009 | Somasundaram et al. .... 370/332 |
| 2009/0239511 A1 | 9/2009 | Chen et al. |
| 2009/0252073 A1 | 10/2009 | Kim et al. |
| 2009/0299788 A1 | 12/2009 | Huber et al. |
| 2009/0310561 A1 | 12/2009 | Grob et al. |
| 2010/0035622 A1* | 2/2010 | Ito et al. ........................ 455/450 |
| 2010/0190496 A1* | 7/2010 | Chinnathambi ............ 455/435.1 |
| 2010/0240397 A1* | 9/2010 | Buchmayer et al. ........ 455/456.1 |
| 2010/0260068 A1* | 10/2010 | Bhatt et al. ..................... 370/254 |
| 2010/0278141 A1* | 11/2010 | Choi-Grogan et al. ........ 370/331 |
| 2011/0110520 A1* | 5/2011 | Ness et al. ..................... 380/270 |
| 2011/0111754 A1* | 5/2011 | Sharaga et al. ............... 455/434 |

* cited by examiner

COMMUNICATION METHOD OF A MOBILE TERMINAL AND METHOD OF ADVERTISING TO A MOBILE TERMINAL

CROSS-REFERENCE TO RELATED APPLICATION(S)

This application claims the benefit under 35 U.S.C. §119(a) of Korean Patent Application No. 10-2010-0055844, filed on Jun. 14, 2010, in the Korean Intellectual Property Office, the entire disclosure of which is incorporated herein by reference for all purposes.

BACKGROUND

1. Field

The following description relates to a method of advertising to a mobile terminal connected to a femto base station, and a communication method of a mobile terminal, a femto base station, and a macro base station.

2. Description of Related Art

Femtocells may be classified into various types, for example, a personal femtocell that may be used to provide an ultrahigh speed transmission service within a predetermined area, a commercial femtocell to provide an advertisement service for sales promotion of a shop, and an authorized femtocell to provide a location service. Most femtocell applications focus on a user's convenience but do not sufficiently consider benefits to various installers and administrators.

In a personal femtocell, a femtocell installer and an administrator may be substantially the same as a service beneficiary, and therefore, various administrative rights need not be distinguished. However, in a commercial femtocell, there is a need to distinguish the rights of a femtocell installer with those of a femtocell administrator in order to protect commercial rights.

SUMMARY

In one general aspect, there is provided a communication method of a macro base station, the method comprising reporting, to at least one femto base station in a macrocell of the macro base station, information about a broadcast channel section used to identify a femtocell in the macrocell, receiving from a mobile terminal position information of the mobile terminal and a request for information about neighbor femto base stations of the mobile terminal, when the mobile terminal identifies an accessible femto base station in the broadcast channel section, generating a list of the neighbor femto base stations and information about the neighbor femto base stations based on the position information of the mobile terminal, and transmitting the list of the neighbor femto base stations and the information about the neighbor femto base stations to the mobile terminal.

The method may further comprise transmitting connection information to enable the mobile terminal to access a femto base station selected by the mobile terminal.

The broadcast channel section may be set in a downlink broadcast channel of the macrocell at a preset cycle.

The information about the neighbor femto base stations may comprise information about a shop in which each of the femto base stations is located or information about a discount policy of a connection service offered by each of the femto base stations.

In another aspect, there is provided a method of offering an advertisement to a mobile terminal connected to a femto base station, the method comprising identifying a voice call transmitting signal transmitted from the mobile terminal, postponing transmission of the voice call transmitting signal, in response to the identification of the voice call transmitting signal, and offering a unique voice advertisement service of the femto base station, in response to the identification of the voice call transmitting signal.

The method may further comprise identifying a ringback tone signal transmitted from a receiving side, and stopping the unique voice advertisement service of the femto base station in response to the identification of the ringback tone signal.

In another aspect, there is provided a method of offering an advertisement to a mobile terminal connected to a femto base station, the method comprising identifying a data communication connection signal transmitted from the mobile terminal, postponing transmission of the data communication connection signal, in response to the identification of the data communication connection signal, and offering a unique advertisement service of the femto base station to the mobile terminal, in response to the identification of the data communication connection signal.

The method may further comprise identifying a data reception signal about a uniform resource locator (URL) address that the mobile terminal desires to access, and stopping the unique advertisement service of the femto base station, in response to the identification of the data reception signal.

In another aspect, there is provided a communication method of a mobile terminal, the method comprising detecting a broadcast channel section used to identify a femtocell in a macrocell, identifying a femto base station accessible to the mobile terminal based on a measurement of an intensity of a signal of the broadcast channel section, transmitting, to a macro base station, position information of the mobile terminal and a request for information about the accessible femto base station, receiving a list of neighbor femto base stations of the mobile terminal and information about the neighbor femto base stations from the macro base station, and selecting a femto base station based on the list and the information about the neighbor femto base stations.

The detecting of the broadcast channel section is performed when a femtocell exploration mode of the mobile terminal is set to on.

The indentifying of the accessible femto base station may perform by comparing a preset threshold value with the measured intensity of the signal of the broadcast channel section.

The selected femto base station may be selected based on preferences of a user of the mobile terminal.

The method may further comprise receiving connection information to enable access to the selected femto base station from the macro base station.

The broadcast channel section may be set in a downlink broadcast channel of the macrocell at a preset cycle.

The information about the neighbor femto base stations may comprise information about a shop in which the femto base stations are located, respectively, or comprises information about a discount policy of a connection service offered by each respective femto base station.

In another aspect, there is provided a communication method of a femto base station, the method comprising receiving, from a macro base station, a report about a broadcast channel section used to identify a femtocell in a macrocell of the macro base station, and setting a signal in the broadcast channel section to report existence of a femtocell of the femto base station within the macrocell.

In another aspect, there is provided a computer-readable storage medium having stored therein program instructions to cause a processor to execute a communication method of a macro base station, the method comprising reporting, to at least one femto base station in a macrocell of the macro base station, information about a broadcast channel section used to identify a femtocell in the macrocell, receiving from a mobile terminal position information of the mobile terminal and a request for information about neighbor femto base stations of the mobile terminal, when the mobile terminal identifies an accessible femto base station in the broadcast channel section, generating a list of the neighbor femto base stations and information about the neighbor femto base stations based on the position information of the mobile terminal, and transmitting the list of the neighbor femto base stations and the information about the neighbor femto base stations to the mobile terminal.

Other features and aspects may apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

As described herein, a macrocell refers to a coverage area of a macro base station, and a femtocell refers to a coverage area of a femto base station.

Figure 1:
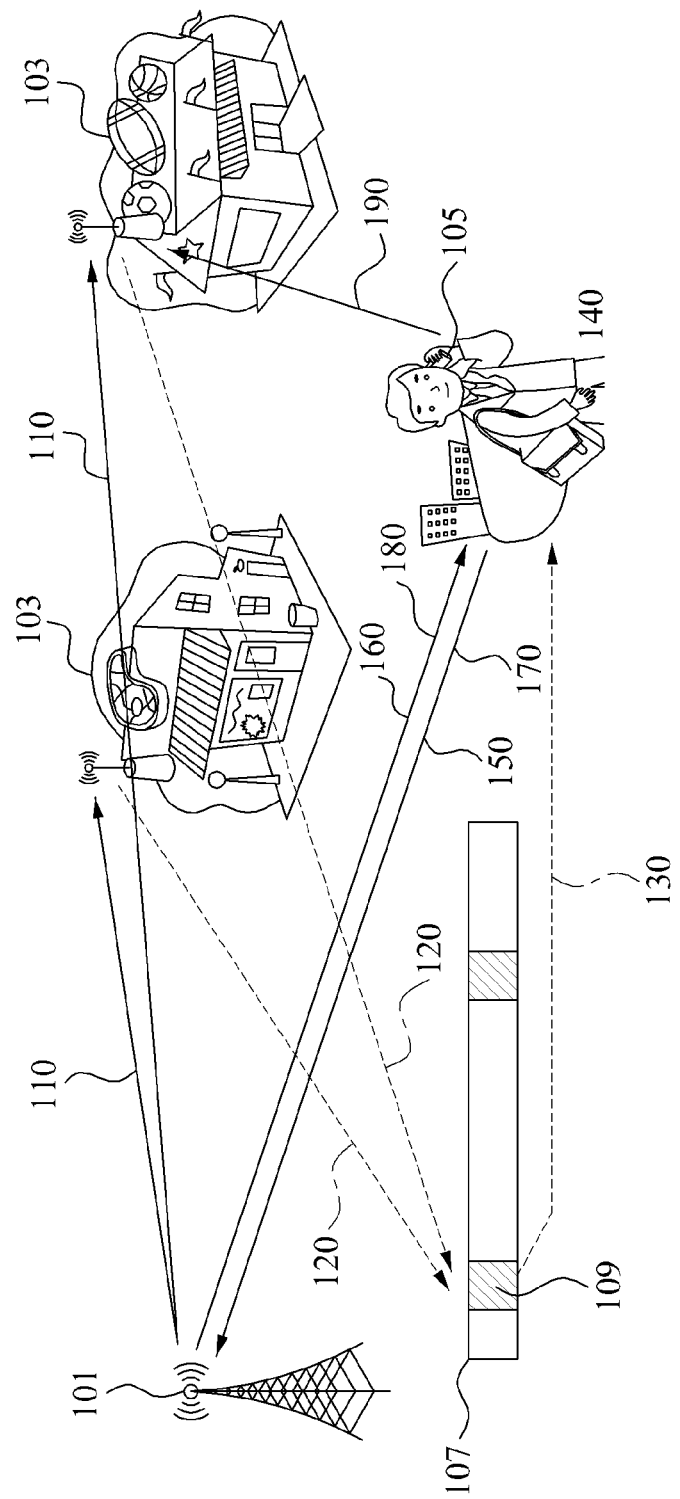
FIG. 1 is a diagram illustrating an example of a network that allows a mobile terminal to identify and connect to a neighbor femtocell.

FIG. 1 illustrates an example of a network that allows a mobile terminal to identify and connect to a neighbor femtocell.

Referring to FIG. 1, the network in which the mobile terminal identifies and connects to the neighbor femtocell includes a macro base station 101, two femto base stations 103, and a mobile terminal 105. It should be appreciated that the number of macro base stations, femto base stations, and mobile terminals are not limited to the example shown in FIG. 1. For example, the network may include one or more macro base stations, one or more femto base stations, and one or more mobile terminals.

The macro base station coverage area includes a macrocell. The macro base station 101 sets up a broadcast channel section 109 within a downlink broadcast channel to identify a femtocell. The macro base station 101 reports the broadcast channel section 109 to at least one femto base station 103 in the macrocell.

For example, the macro base station 101 may be linked with the femto base station 103 positioned in the macrocell, and maintain and renew a database including connection information. The connection information may include, for example, information about linked femto base stations 103, information about shops in which the linked femto base stations 103 are located, and the like.

For example, the macro base station 101 may renew the database at a time when a femto base station 103 is added to the macrocell, at a preset time, or at any other desired time.

The femto base stations 103 may offer various services, for example, real-time advertisements and event announcements of shops to the mobile terminal 105 as the user of the mobile terminal is within the coverage area of the femto base stations or passing by the shops in which the femto base stations 103 are located.

For example, the femto base stations 103 may be linked with the macro base station 101 to attract customers passing by the shops in which the femto base stations 103 are located. The femto base stations 103 may be synchronized and linked with the macro base station 101.

The mobile terminal 105 may set itself in a femtocell exploration mode to automatically identify a femtocell. For example, when the femtocell exploration mode of the mobile terminal 105 is set to 'ON,' the mobile terminal 105 may detect the broadcast channel section 109 in order to identify a femtocell in the macrocell and identify whether there is a neighbor femtocell. During the femtocell exploration mode, the mobile terminal 105 may detect one or more femtocells corresponding to one or more femto base stations 103, which are within the macrocell of the macro base station 101 and are available for the mobile terminal 105 to connect with.

The mobile terminal 105 may select a femto base station 103 from among the one or more detected femto base stations 103 based on a user preference of the mobile terminal 105 and/or information about neighbor femto base stations 103 received from the macro base station 101. Accordingly, the mobile terminal 105 may be provided with a unique advertisement service of the femto base station 103 while located within a femtocell of the femto base station 103.

For example, the unique advertisement service of the femto base station 103 may include products sold by a shop in which the femto base station 103 is located, an advertisement for the shop, an advertisement service for an event held by the shop, and the like.

As an example, when the shop in which the femto base station 103 is located is an ice cream shop, an advertisement service for the shop may include an advertisement for a new flavor of ice cream that may be purchased in the shop, discount information about products "on sale", discount coupons, and the like.

As described herein, when the femtocell exploration mode of the mobile terminal 105 is set to 'ON,' the mobile terminal 105 may detect the broadcast channel section 109 to identify a femtocell of a femto base station 103 located within the macrocell of the macro base station 101, and be provided with the a unique advertisement service of the femto base station 103.

The broadcast channel section 109 used to identify the femtocell in the macrocell may be set at a preset cycle, for example, a cycle of a hundred milliseconds, two hundred milliseconds, five hundred milliseconds, or other desired amount of time.

Hereinafter, a method including the macro base station 101, the femto base station 103, and the mobile terminal 105 in which the mobile terminal 105 identifies a neighbor femto base station 103 of the mobile terminal 105 and connect to the femto base station 103, is described.

As indicated by reference numeral 110, the macro base station 101 reports information about the broadcast channel section 109 to the femtocell corresponding to at least one femto base station 103 in the macrocell. For example, the macro base station may report to one or more femto base stations 103.

The femto base station 103 receiving a report about the broadcast channel section 109 from the macro base station 101 may set a signal in the broadcast channel section 109 in order to report the existence of the femtocell corresponding to the femto base station 103, as indicated by reference numeral 120. For example, the broadcast channel section 109 of the downlink broadcast channel may be set to a single bit or multiple bits.

In 120, the femto base station 103 may set various types of signals in the broadcast channel section 109 to report the existence of the femtocell of the femto base station 103, for example, the femto base station 103 may set a particular bit of the broadcast channel section 109 to '1' or set the broadcast channel section 109 to a dummy signal.

When the femtocell exploration mode of the mobile terminal 105 is set to ON as indicated by reference numeral 130, the mobile terminal 105 may detect the broadcast channel section 109 to identify that the femtocell corresponding to the a femto base station 103 is within the macrocell corresponding to the macro base station 101.

The mobile terminal 105 may identify a femto base station 103 accessible to the mobile terminal 105 from among the at least one femto base station 103 that is within the macrocell of the macro base station, based on a measurement result of an intensity of the signal of the broadcast channel section 109, in 140.

For example, when the measurement result of the intensity of the signal in the broadcast channel section 109 is higher than a preset threshold value, the mobile terminal 105 may identify that there is at least one femto base station 103 neighboring the mobile terminal 105 and accessible to the mobile terminal 105. As another example, based on the intensity of the signal, the mobile terminal 105 may determine that a plurality of femto base stations are neighboring and available, for example, two femto base stations, three femto base stations, four femto base stations, or more femto base stations. The femto base station 103 may set a signal in the broadcast channel section 109 upon receiving the report about the broadcast channel section 109 from the macro base station 101.

The mobile terminal 105 may transmit its position information to the macro base station 101, and may transmit a request to the macro base station 101 for information about the femto base station 103 which is accessible to the mobile terminal 105, in 150.

For example, the macro base station 101 may generate a list of neighbor femto base stations 103 and information about the neighbor femto base stations 103 based on the position information of the mobile terminal 105 received from the mobile terminal 105, and may transmit the generated information to the mobile terminal 105, in 160.

As an example, the information about the neighbor femto base stations 103 of the mobile terminal 105 may include information about a shop in which each of the respective femto base stations 103 is located or information about a discount policy of a connection service offered by each of the femto base stations 103.

The mobile terminal 105 may select one femto base station 103 based on the list of the neighbor femto base stations 103 and the information about the neighbor femto base stations 103 received from the macro base station 101, in 170.

In 170, the mobile terminal 105 may select the femto base station 103 in the list of the neighbor femto base stations 103 based on a user preference of the mobile terminal 105 and/or the information about the neighbor femto base stations 103 of the mobile terminal 105.

An example of the list of the neighbor femto base stations 103 received from the macro base station 101 may include the following contents as shown in Table 1.

TABLE 1

| Location of Base station | Femto base station ID | Business category | Policy for use | Transmission speed |
| --- | --- | --- | --- | --- |
| a | A | Cosmetics | free | Low |
| a | B | Clothing | 10 cents/min | High |
| a | C | Entertainment | free | Medium |
| a | D | Fast food | 5 cent/min (free when receiving advertisements) | High |

In this example, the mobile terminal 105 receives information about four femto base stations A, B, C, and D neighboring the mobile terminal 105 from the macro base station 101. Accordingly, if a user of the mobile terminal 105 prefers a femto base station that provides a high transmittance speed and a free communication channel, the user of the mobile terminal 105 may select femto base station D to receive communication from. In other words, among the femto base stations B and D that provide a high transmittance speed and the femto base stations A, C, and D that provide a free communication channel, the mobile terminal 105 may automatically select or a user of the mobile terminal 105 may select the femto base station D which satisfies all user preferences.

For example, the mobile terminal 105 may use the communication channel provided by the selected femto base station D. Further, the mobile terminal 105 may be provided with information about a shop in which the femto base station D is located or information about a discount policy of a connection service offered by the femto base station D from the femto base station D.

In this example, the femto base station D corresponds to a femto base station of a fast food restaurant. Accordingly, the mobile terminal 105 may be provided with information about the fast food restaurant in which the femto base station D is located, information about a sales event offered by the fast food restaurant, coupons for discounts offered by the fast food restaurant, and an advertisement for the sales event.

As another example, the mobile terminal 105 may select a femto base station 103 based on the interest of the user of the mobile terminal 105. For example, the mobile terminal 105 may select a femto base station 103 located in a shop of interest a shop offering a sales event, a shop providing a coupon of a product for a discount when receiving an advertisement service, and the like.

As described above, the mobile terminal 105 may automatically select a femto base station 103 from the list by various methods. Depending on the femto base station 103 selected, the user of the mobile terminal 105 may be provided with an advertisement service from the femto base station 103.

Further, the mobile terminal 105 itself may provide the list of the neighbor femto base stations 103 and information about their events to allow a user to select a femto base station 103.

As another example, a femto base station 103 may be automatically selected by the macro base station 101. In yet other embodiments, the femto base station 103 may be automatically selected by the mobile terminal 105 based on predetermined settings or dynamically adjusted settings that may be dynamically set by a user. As yet another example, the femto base station 103 may be selected by a user of the mobile terminal 105.

As another example, the macro base station 101 may store a user preference of the mobile terminal 105 and the information about the femto base stations 103 in advance, and selectively provide a femto base station 103 that satisfies the user preference based on stored information.

For example, the macro base station 101 may include a database of information about the user preference of the mobile terminal 105 shown in the following Table 2.

TABLE 2

| Mobile terminal ID | Age groups | Policy for use | Transmission speed | Interested business category | Others |
|---|---|---|---|---|---|
| A | 20s | Free | Medium | Communication terminals, games | Selecting free of charge when receiving advertisements |
| B | 30s | Free/charged | High | Restaurants | High transmission speed |
| C | 40s | Free | Medium | Sports, book stores | Receiving sports-related advertisements |

The macro base station 101 may select the femto base stations that satisfy the user preferences of the mobile terminal 105 shown in Table 2 and provide them to the mobile terminal 105.

After receiving the selection from the mobile terminal 105, the macro base station 101 may transmit connection information to the mobile terminal 105 to enable an access to the selected femto base station 103, in 180.

The mobile terminal 105 may connect to the selected femto base station 103 using the connection information received from the macro base station 101, in 190.

Accordingly, the mobile terminal 105 connected to the femto base station 103 may be provided with various communication services and advertisement services offered by the femto base station 103.

For example, the advertisement services may include a unique voice advertisement service of the femto base station 103 and a unique display advertisement service of the femto base station 103. For example, the unique voice advertisement service of the femto base station 103 may be provided to the mobile terminal 105 while the mobile terminal 105 inputs a telephone number and waits for a call to connect.

As described herein, the unique advertisement service of the femto base station 103 may be provided to the mobile terminal 105 while the mobile terminal 105 waits for data reception about a uniform resource locator (URL) address which the mobile terminal 105 desires to access.

Figure 2:
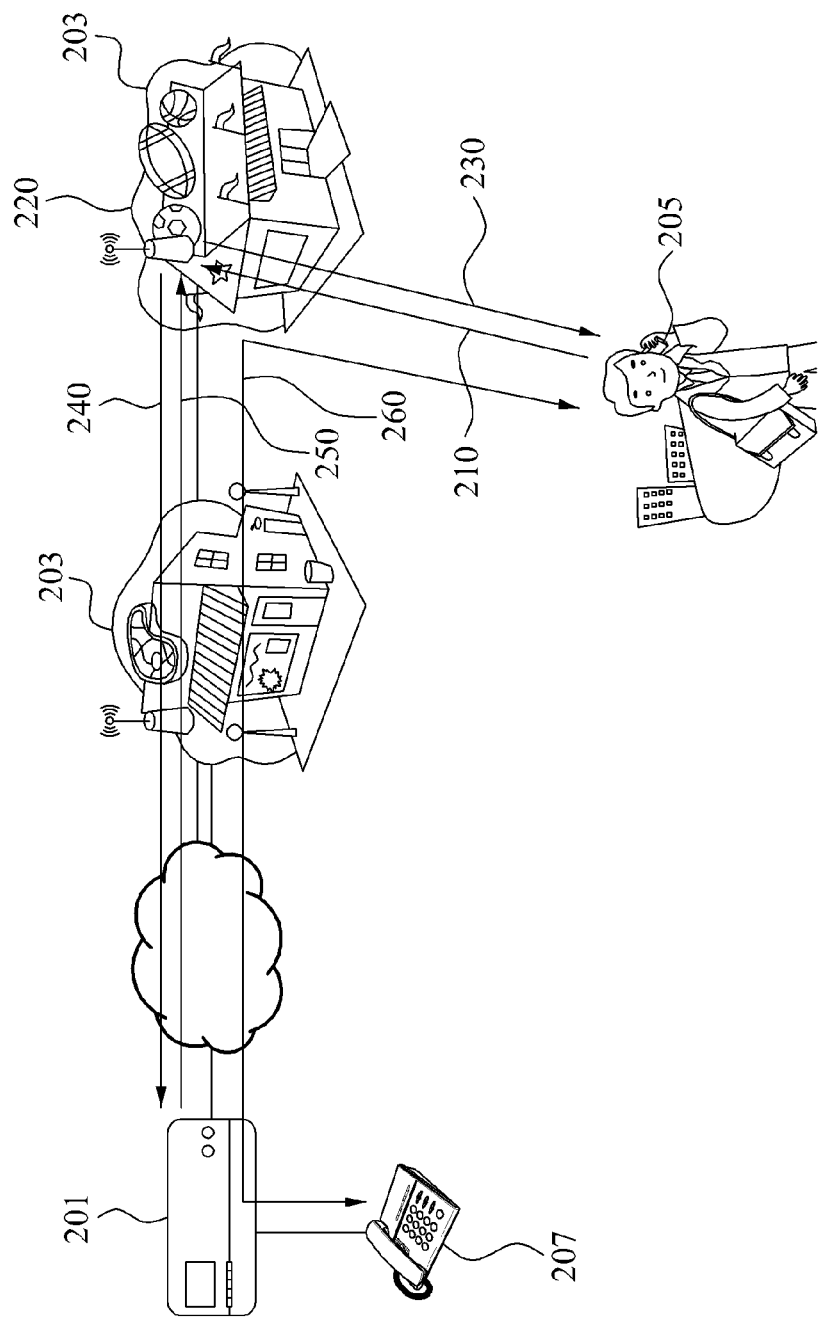
FIG. 2 is a diagram illustrating an example of a network that allows a femto base station to offer an advertisement to a mobile terminal connected to the femto base station.

FIG. 2 illustrates an example of a network that allows a femto base station to offer an advertisement to a mobile terminal connected to the femto base station.

Referring to FIG. 2, the network for providing the advertisement to the mobile terminal includes a counterpart exchange station 201, a femto base station 203, a mobile terminal 205, and a receiving side mobile terminal 207.

For example, a user in control of the mobile terminal 205 passing by a shop in which the femto base station 203 is located may attempt to call a friend by entering the phone number of a friend that corresponds to the receiving side mobile terminal 207, to try a call, in 210.

In response to the call being placed by the user of the mobile terminal 205, the femto base station 203 identifies a voice call transmitting signal transmitted from the mobile terminal 205 based on the call being placed. Accordingly, the femto base station 203 may provide an advertisement to the mobile terminal 205 connected to the femto base station 203, and postpone transmission of the voice call transmitting signal in response to the identification of the voice call transmitting signal, in 220.

For example, the femto base station 203 may include a voice call transmitting signal identification module that may identify the voice call transmitting signal transmitted from the mobile terminal 205. The femto base station 203 may offer a unique voice advertisement service of the femto base station 203 to the mobile terminal 205 in response to the identification of the voice call transmitting signal, in 230.

The femto base station 203 forwards the postponed voice call transmitting signal to the counterpart exchange station 201, in 240. For example, the femto base station 203 may forward the postponed voice call transmitting signal after a predetermined amount of time elapses.

For example, the femto base station 203 may identify a ringback tone signal transmitted from the receiving side mobile terminal 207, and accordingly, the femto base station 203 stops the unique voice advertisement service of the femto base station 203 in response to the identification of the ringback tone signal, in 250.

After stopping the unique voice advertisement service of the femto base station 203, the femto base station 203 may forward the ringback tone signal to the mobile terminal 205 to connect a voice call, in 260.

Figure 3:
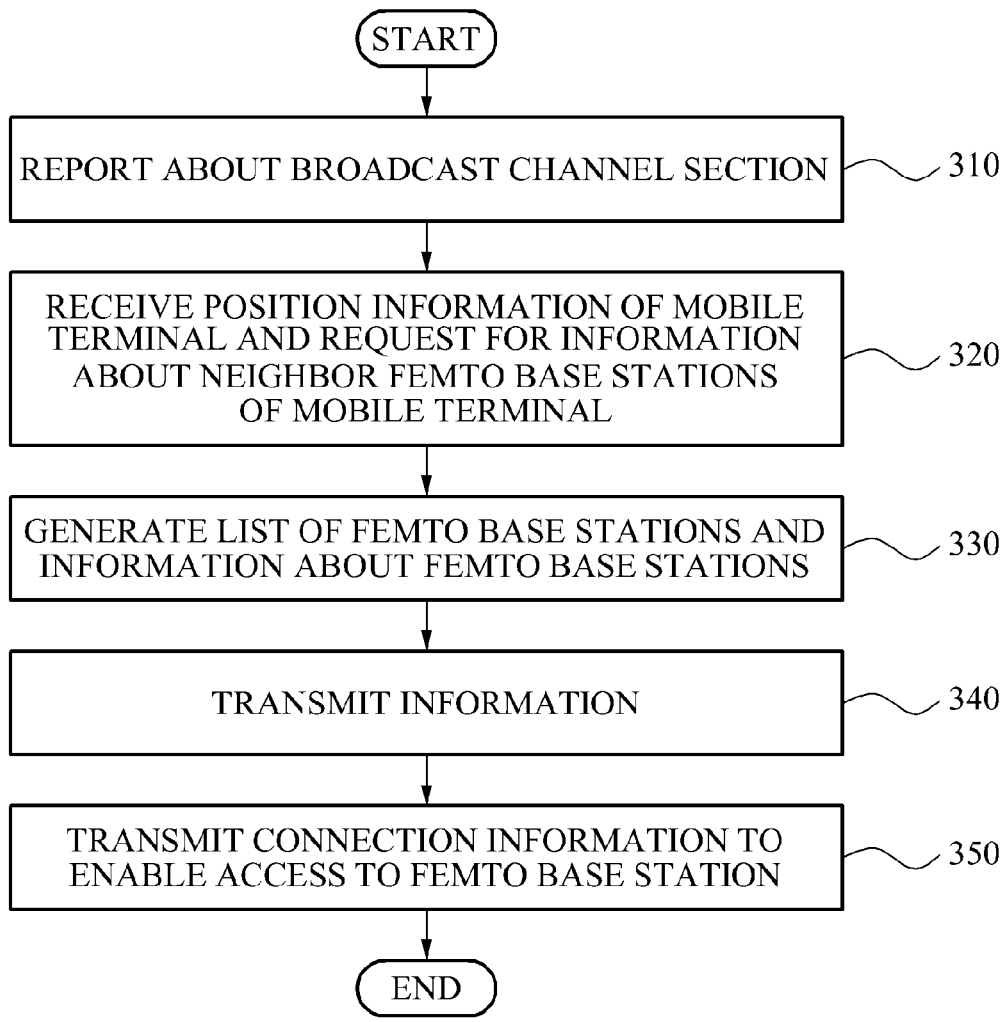
FIG. 3 is a flowchart illustrating an example of a communication method of a macro base station.

FIG. 3 illustrates an example of a communication method of a macro base station.

Referring to FIG. 3, the macro base station reports information about a broadcast channel section to at least one femto base station in the macrocell, in 310. For example, the broadcast channel may be set in the downlink broadcast channel of the macrocell at a preset cycle.

The macro base station receives position information of a mobile terminal and a request for information about neighbor femto base stations of the mobile terminal, in 320. For example, the position information and the request for information may be transmitted from the mobile terminal when the mobile terminal identifies an accessible femto base station.

The information about the neighbor femto base stations of the mobile terminal may include information about a shop in which each of the femto base stations is located. As another example, the information may include a discount policy of a connection service offered by each of the femto base stations.

The macro base station generates a list of the neighbor femto base stations of the mobile terminal and information about the neighbor femto base stations of the mobile terminal based on the position information of the mobile terminal, in 330.

The macro base station transmits the list of the neighbor femto base stations of the mobile terminal and the information about the neighbor femto base stations of the mobile terminal to the mobile terminal, in 340.

In 350, the macro base station may transmit connection information to enable the mobile terminal access to a femto base station.

The connection information to enable the mobile terminal access to the femto base station may be information about a femto base station selected by the mobile terminal from among the neighbor femto base stations of the mobile terminal in the list.

Figure 4:
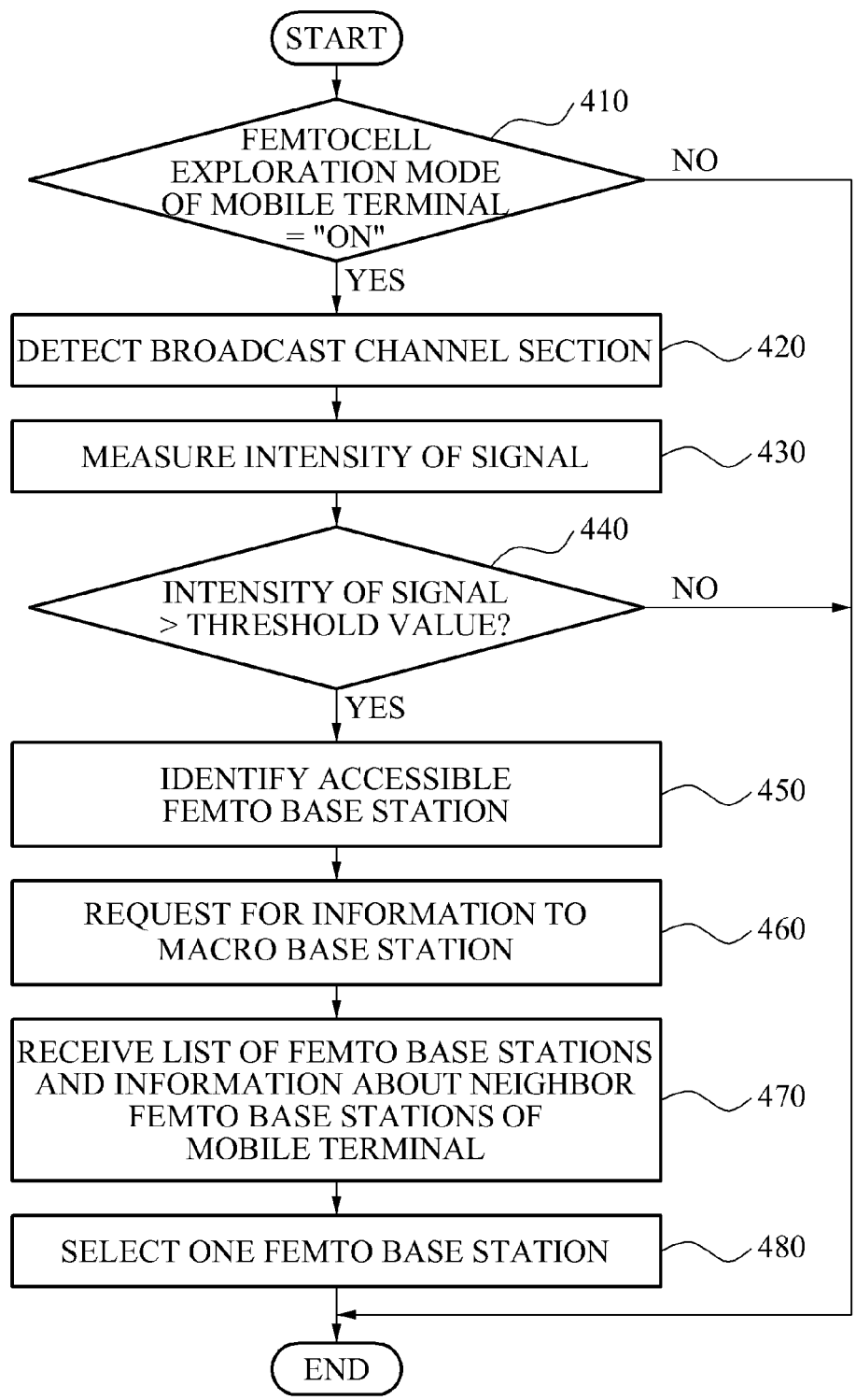
FIG. 4 is a flowchart illustrating an example of a communication method of a mobile terminal.

FIG. 4 illustrates an example of a communication method of a mobile terminal Referring to FIG. 4, the mobile terminal may determine whether a femtocell exploration mode is set to 'ON', in 410.

When the femtocell exploration mode is set to 'ON,' the mobile terminal detects a broadcast channel section to identify a femtocell, in 420. For example, the broadcast channel section may be set in the downlink broadcast channel of the macrocell at a preset cycle.

As a result of the determination in 410, if the femtocell exploration mode is not set to 'ON,' or the mobile terminal does not have a femtocell exploration function, the mobile terminal may finish the process without performing subsequent operations.

The mobile terminal identifies a femto base station accessible to the mobile terminal based on a measurement of an intensity of a signal of the broadcast channel section in order to identify the femtocell in the macrocell. For example, the mobile terminal may measure the intensity of the signal of the broadcast channel section to identify the femtocell and compare the measurement result with a preset threshold value, in 440.

When the intensity of the signal of the broadcast channel section measured in 440 is higher than the preset threshold value, the mobile terminal may identify that the femto base station is accessible to the mobile terminal, in 450.

The mobile terminal transmits, to a macro base station, its position information and a request for information about the accessible femto base station, in 460. The mobile terminal receives the requested information from the macro base station, in 470. For example, the information received from the macro base station may include a list of neighbor femto base stations of the mobile terminal and information about them. For example, the list and the information may be generated based on the position information of the mobile terminal. As an example, the information about the neighbor femto base stations may include information about a shop in which each of the femto base stations is located or include information about a discount policy of a connection service offered by each of the femto base stations.

The mobile terminal may select a femto base station based on the list of the neighbor femto base stations and the information about them, in 480. For example, the mobile terminal may use a preference of a user of the mobile terminal and the information about the neighbor femto base stations in selecting a femto base station.

Figure 5:
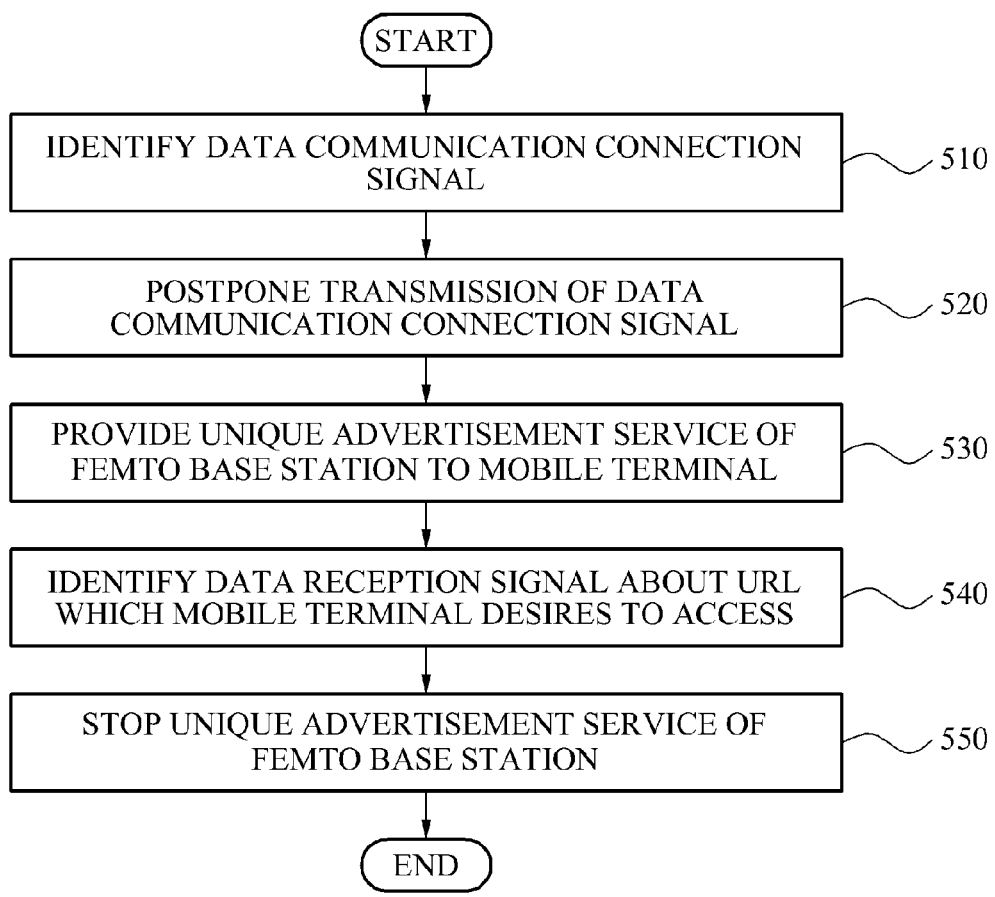
FIG. 5 is a flowchart illustrating an example of a method of offering an advertisement to a mobile terminal connected to a femto base station.

FIG. 5 illustrates an example of a method of offering an advertisement to a mobile terminal connected to a femto base station.

Referring to FIG. 5, when the mobile terminal inputs a data communication connection signal such as a URL address which the mobile terminal desires to access, the femto base station identifies the data communication connection signal transmitted from the mobile terminal, in 510.

The femto base station postpones transmission of the data communication connection signal in response to the identification of the data communication connection signal, in 520.

The femto base station offers a unique advertisement service of the femto base station to the mobile terminal, in response to the identification of the data communication connection signal, in 530. And, after a lapse of a predetermined amount of time, For example, the femto base station may forward the postponed data communication connection signal to an internet server in operation.

In 540, the femto base station identifies a data reception signal about the URL address which the mobile terminal desires to access. For example, the femto base station may include a functional module to identify a data reception signal such as a homepage or a URL address which the mobile terminal desires in order to identify the data reception signal.

The femto base station may stop a unique advertisement service in response to the identification of the data reception signal about the URL address which the mobile terminal desires to access, in 550. The femto base station may forward the data reception signal about the URL address to the mobile terminal for connection.

As described herein, the mobile terminal may include various modes such as a femtocell exploration mode. However, it should be appreciated that the mobile terminal may only have one mode in which the mobile terminal constantly searches for an available femtocell.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image sensor (CIS), a mobile Dynamic Random Access Memory (DRAM), and the like. The memory controller and the flash memory device may constitute a solid state drive/disk (SSD) that uses a non-volatile memory to store data.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a macro base station, the method comprising:
   reporting, to at least one femto base station in a macrocell of the macro base station, information about a broadcast channel section used to identify a femtocell in the macrocell;
   receiving from a mobile terminal position information of the mobile terminal and a request for information about neighbor femto base stations of the mobile terminal, when the mobile terminal identifies an accessible femto base station in the broadcast channel section;
   generating a list of the neighbor femto base stations and information about the neighbor femto base stations based on the position information of the mobile terminal; and
   transmitting the list of the neighbor femto base stations and the information about the neighbor femto base stations to the mobile terminal.

2. The method of claim 1, further comprising transmitting connection information to enable the mobile terminal to access a femto base station selected by the mobile terminal.

3. The method of claim 1, wherein the broadcast channel section is set in a downlink broadcast channel of the macrocell at a preset cycle.

4. The method of claim 1, wherein the information about the neighbor femto base stations comprises information about a shop in which each of the femto base stations is located or information about a discount policy of a connection service offered by each of the femto base stations.

5. A communication method of a mobile terminal, the method comprising:
   detecting a broadcast channel section used to identify a femtocell in a macrocell;
   identifying a femto base station accessible to the mobile terminal based on a measurement of an intensity of a signal of the broadcast channel section;
   transmitting, to a macro base station, position information of the mobile terminal and a request for information about the accessible femto base station;
   receiving a list of neighbor femto base stations of the mobile terminal and information about the neighbor femto base stations from the macro base station; and
   selecting a femto base station based on the list and the information about the neighbor femto base stations.

6. The method of claim 5, wherein the detecting of the broadcast channel section is performed when a femtocell exploration mode of the mobile terminal is set to on.

7. The method of claim 5, wherein the identifying of the accessible femto base station is performed by comparing a preset threshold value with the measured intensity of the signal of the broadcast channel section.

8. The method of claim 5, wherein the selected femto base station is selected based on preferences of a user of the mobile terminal.

9. The method of claim 5, further comprising receiving connection information to enable access to the selected femto base station from the macro base station.

10. The method of claim 5, wherein the broadcast channel section is set in a downlink broadcast channel of the macrocell at a preset cycle.

11. The method of claim 5, wherein the information about the neighbor femto base stations comprises information about a shop in which the femto base stations are located, respectively, or comprises information about a discount policy of a connection service offered by each respective femto base station.

12. A communication method of a femto base station, the method comprising: receiving, by the femto base station from a macro base station, a report about a broadcast channel section used to identify a femtocell in a macrocell of the macro base station; setting, by the femto base station, a signal in the broadcast channel section to report existence of a femtocell of the femto base station within the macrocell; and connecting, by the femto base station, to a mobile terminal that detects the broadcast channel section to identify the femtocell of the femto base station within the macrocell.

13. The method of claim 12, further comprising setting, by the femto base station, the signal in the broadcast channel section to report existence of the femtocell of the femto base station within the macrocell upon receipt of the report about the broadcast channel section.

14. A non-transitory computer-readable storage medium having stored therein program instructions to cause a processor to execute a communication method of a macro base station, the method comprising:
   reporting, to at least one femto base station in a macrocell of the macro base station, information about a broadcast channel section used to identify a femtocell in the macrocell;
   receiving from a mobile terminal position information of the mobile terminal and a request for information about neighbor femto base stations of the mobile terminal, when the mobile terminal identifies an accessible femto base station in the broadcast channel section;
   generating a list of the neighbor femto base stations and information about the neighbor femto base stations based on the position information of the mobile terminal; and
   transmitting the list of the neighbor femto base stations and the information about the neighbor femto base stations to the mobile terminal.

* * * * *